H. Twitchell,
Dental Plate.

No. 88,682.  Patented Apr. 6, 1869.

WITNESSES:
A. Bennersendorf
Wm. A. Morgan

INVENTOR:
Twitchell
per
Munn & Co.
attorneys

HENRY TWITCHELL, OF PULASKI, NEW YORK.

Letters Patent No. 88,682, dated April 6, 1869.

IMPROVEMENT IN DENTAL PLATES.

The Schedule referred to in these Letters Patent and making part of the same.

*To all whom it may concern:*

Be it known that I, HENRY TWITCHELL, of Pulaski, in the county of Oswego, and State of New York, have invented a new and useful Improvement in Dental Plates; and I do hereby declare that the following is a full, clear, and exact description thereof, which will enable others skilled in the art to make and use the same, reference being had to the accompanying drawings, forming part of this specification.

This invention relates to improvements in dental plates, whereby it is designed to provide plates that will have greater firmness or adhesion in the mouth, and which will be more soft and yielding in the contact with the surface of the mouth.

It consists in providing a soft rubber facing throughout all the portions of the plate which come into contact with the mouth.

Figure 1:
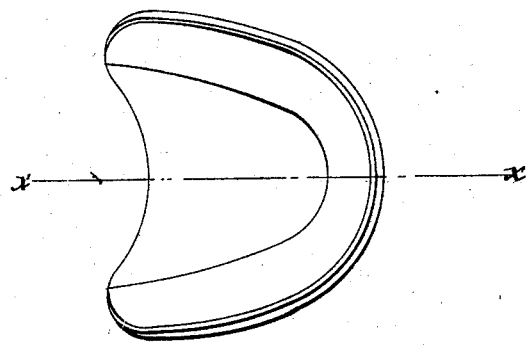
Figure 2:
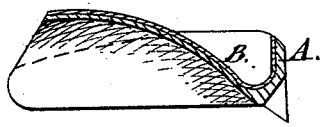

Figure 1 represents a plan view of a dental plate, constructed according to my improvement; and Figure 2 represents a transverse section of the same.

Similar letters of reference indicate like parts.

I propose to construct dental plates with a hard base of rubber, or any other suitable material, in the ordinary manner, as represented at A, which I propose to cover, on the entire interior surface, with a thin sheet of soft rubber, B, to be secured in any preferred manner. It may also extend over the edge of the plate, which comes in contact with the cheeks.

This arrangement prevents the irritation that arises from the hard rubber pressing upon the gums and cheeks. It also gives greater firmness and adhesion of the plate to the gums, and to the roof of the mouth, preventing the ingress of food between the plate and the gums, and also preventing the displacement of the plate, by any working of the latter upon the roof of the mouth, and fills up any interstices, and prevents the admission of the air in case of any rocking or slight displacement.

It may, in some instances, serve a good purpose to extend the said lining only in part over the entire surface, but I prefer to arrange it over the whole.

Having thus described my invention,

I claim as new, and desire to secure by Letters Patent—

Dental plates, whether constructed of hard rubber, or other material, provided with soft rubber lining, extending wholly or partly over the entire interior surface of the same, substantially as and for the purpose described.

The above specification of my invention, signed by me, this     day of    , 1868.

HENRY TWITCHELL.

Witnesses:
 FRANK BLOCKLEY,
 ALEX. F. ROBERTS.